0
United States Patent Office 2,824,712
Patented Feb. 25, 1958

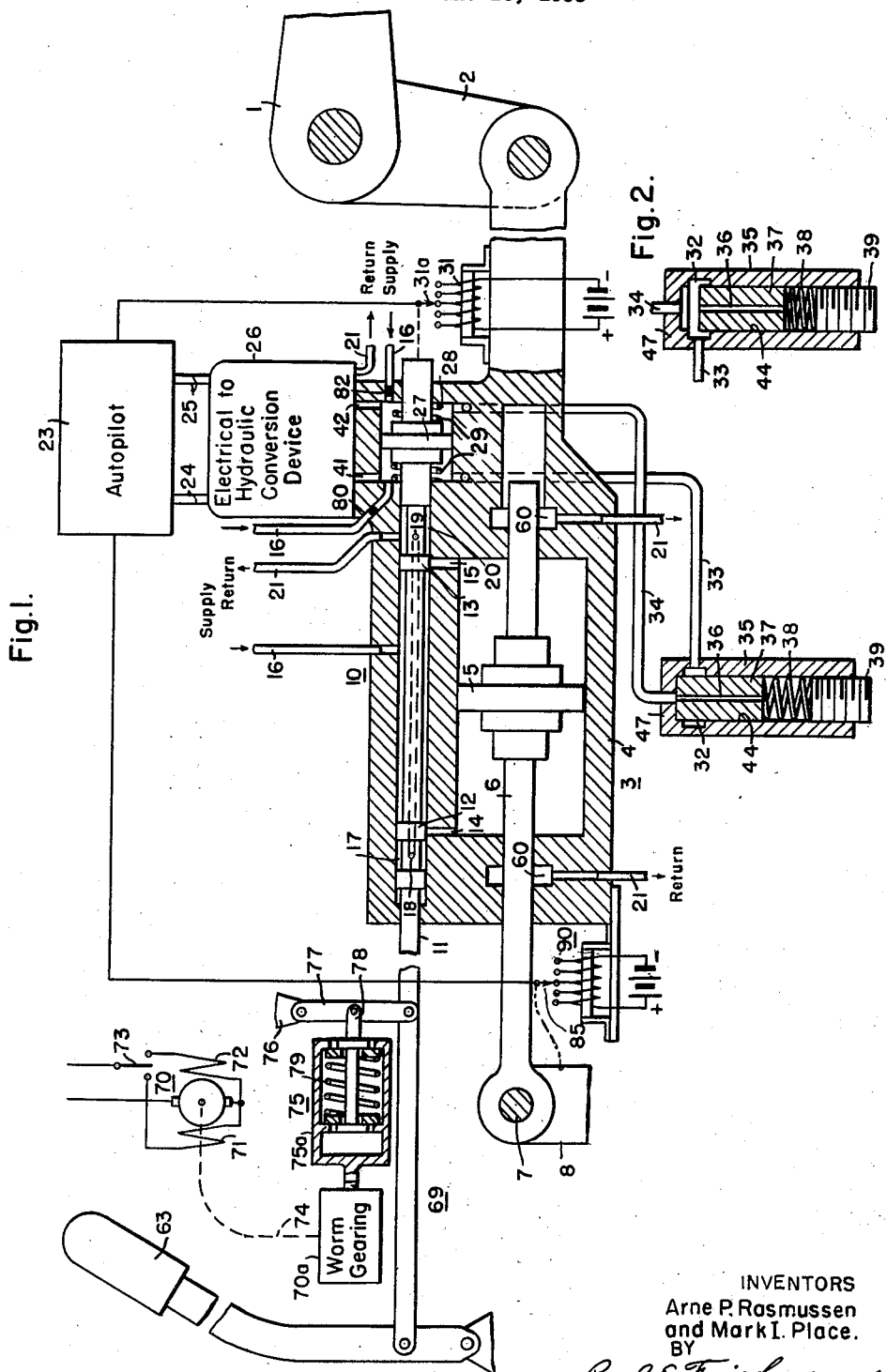

2,824,712

AIRCRAFT CONTROL SYSTEM FOR LIMITING AIRFRAME STRESS

Arne P. Rasmussen, Millersville, and Mark I. Place, Glen Burnie, Md., assignors to Westinghouse Electric Corporation, East Pittsburgh, Pa., a corporation of Pennsylvania Application January 18, 1955, Serial No. 482,452

7 Claims. (Cl. 244—78)

Our invention relates generally to aircraft control systems and, more particularly, to aircraft control systems for limiting the centrifugal force exerted on the structural members of the aircraft during flight maneuvers of the aircraft.

Flight control systems for aircraft have been developed in recent years wherein both the pilot and autopilot exercise a very high mechanical advantage over the control surfaces of the aircraft during flight maneuvers thereof. This is particularly true of control systems making use of hydraulic power boost or of complete power control such as the system described in copending application Serial No. 375,546 of Arne P. Rasmussen, for "Control System," filed August 20, 1953, now U. S. Patent No. 2,773,660, and assigned to the assignee of the present invention.

It is known that due to varying flight conditions, the control effect that may be exerted over an aircraft varies over extreme ranges. For example, a given deflection of the control surfaces will produce a far greater effect at a relatively high speed in the vicinity of 400 or 500 miles per hour than at the very low speeds that are requisite for safe landing operations. Likewise, a deflection of the control surfaces that will change the attitude of the aircraft so as to exert a maximum safe centrifugal force thereon at an altitude of 50,000 feet will virtually tear the aircraft apart at an altitude of 2,000 feet. Inasmuch as an autopilot is unable to sense the fact that the flight conditions have changed, it would be relatively simple for the structural members of the aircraft to be severely damaged if, while the aircraft were operating at low altitudes, a strong deflection signal were injected into the autopilot, for example, from a radar gun sight such as would be necessary to command maximum safe rate of change of attitude of the aircraft at a high altitude.

Furthermore, since the autopilot is essentially an electronic device, it is peculiarly susceptible to malfunction produced by failure of electrical components thereof. For example, a short circuit or a failure of one of the thermionic tubes or other components in the electronic circuitry could produce an output oversignal of such a magnitude that would effect a rate of change of the aircraft far beyond that for which it is designed at any operating speed.

Accordingly, it is an object of this invention to provide an aircraft control system that will limit changes in attitude of the aircraft in accordance with a predetermined maximum centrifugal force to be exerted thereon during flight maneuvers of the aircraft.

Another object is to provide an aircraft control system for limiting the rate of change of attitude of the aircraft in accordance with the maximum safe loading on the flight surfaces thereof.

A further object is to provide an aircraft control system which is adapted to limit changes in attitude of the aircraft in accordance with the maximum safe wing loading on the aircraft without unduly impairing control over the aircraft under any given flight conditions.

A still further object is to provide an aircraft control system adapted for use with an autopilot wherein provision is made for protecting the aircraft against severe rates of change of attitude such as would be occasioned by malfunction of the autopilot.

The foregoing statements are merely illustrative of the various aims and objects of this invention. Other objects and advantages will become apparent upon reading the following description when considered in conjunction with the accompanying drawing, wherein:

Figure 1 schematically illustrates an aircraft control arrangement embodying the principles of this invention; and Fig. 2 is a sectional view of a control valve which is part of the control arrangement of Fig. 1.

In one aspect of our invention, a hydraulic actuator is connected so as to mechanically control the movement of an aircraft control surface, such as an elevator, in accordance with signals from both an autopilot and a manual stick controller. The control signals from these two sources are imparted to the hydraulic actuator through a control valve which controls the flow of fluid to chambers within the actuator formed by a fixed piston therein. The piston is restrained against movement by being physically attached to a stationary member external of the actuator, and the actuator is adapted to move in accordance with the pressure differential between opposite faces of the piston. The autopilot is coupled to the control valve through an electric-to-hydraulic conversion unit that controls the pressure differential across the piston affixed to the movable rod of the control valve. When the aircraft is maneuvered so as to exceed a given centripetal force, a relief valve is actuated which relieves the pressure between the chambers formed by the piston and the actuator so as to prevent further movement of the actuator. This relief valve includes a housing having a well therein and a spring loaded valve member in sliding fit within the well. Small conduits or other convenient means connect the chambers formed by the relief valve and the control valve to the interior of the housing so that under normal operating conditions the valve member effectively prevents communication therebetween. When a given centrifugal force determined by the amount of spring loading on the relief valve member is exceeded, the valve member will move sufficiently to effect fluid communication between the conduits and, consequently, between the opposite sides of the control valve piston so as to prevent further increase of pressure between the opposite faces of the piston and limit further movement of the actuator. Upon decrease of the speed of the aircraft or upon decrease of the control signal which brought about the change in attitude of the aircraft, the centrifugal force on the valve will be lessened and the valve member will pop back to its normal position. Thereafter, normal control may be exercised over the flight surfaces of the aircraft by the autopilot.

More specifically and with reference to Fig. 1, there is shown in considerable detail an aircraft control system making use of the principles of our invention. An elevator control surface 1 is shown connected to a control horn 2 which is driven by a hydraulic actuator generally designated 3 comprising a cylinder 4 and a piston 5. The piston 5 is mounted on a rod 6 which strokes within bearings in the end of the cylinder 4 and which extends through the left end of the cylinder, as viewed, where it is pivotally anchored at 7 to a stationary pivot support 8 which is secured to some portion of the aircraft.

This actuator is controlled by a boost valve generally designated 10 which is mounted on the top side of the cylinder and is provided with a slide valve element 11. This slide valve element 11 has a pair of valves 12 and 13 which control the flow of hydraulic fluid through respective ports 14 and 15 in the ends of cylinder 4. Hydraulic fluid under pressure is admitted to the boost valve through a supply conductor 16 which enters the boost valve housing at a point intermediate respective valves 12 and 13.

Displacement of the slide valve element 12 to the right, for example, closes or seals the valve port 14 from the supply of hydraulic fluid and opens the valve port 15 to the supply. High pressure hydraulic fluid is thereby applied to the right side of piston 5 of the actuator. Since the piston 5 is secured against movement, this results in displacement of cylinder 4 to the right, which deflects the elevator 1 upwardly. The diminishing volume on the left side of piston 5 forces hydraulic fluid through the port 14, now functioning as an exhaust port, into a cavity 17 on the left side of the valve 12. The fluid is exhausted from cavity 17 by entering a hole 18 in the shaft of the slide valve element 11 which extends longitudinally of this element to a hole 19 to the right of valve 13. At this point, the fluid exhausts into cavity 20 and into the return line 21 of the hydraulic system.

The complete hydraulic system has not been shown in order to simplify the illustration. However, for the purpose of identification, each supply conductor to the various points of the boost system and each return conductor are respectively numbered 16 and 21. It will be understood from this that the respective conductors may be fed from a common supply source, such as a fluid pressure pump which may or may not be connected with an accumulator to produce a supply of hydraulic pressure. Similarly, each of the return lines 21 may be connected to a suitable pump or other hydraulic fluid reservoir for the system from which the hydraulic fluid is drawn by the pump.

Slide valve element 11 is controlled by two different control sources. One of these is represented by the autopilot 23 shown only in block outline, since its details are unimportant to the present invention, and the other is represented by a control stick 63 which is actuated by the pilot. The autopilot may be any of a number of suitable types, a preferred type being illustrated in U. S. Patent 2,683,288, to C. R. Hanna and assigned to the assignee of this invention. Such an autopilot is capable of producing a pair of differentially related electrical signals which indicate a departure in the desired flight attitude of the aircraft when operating in the cruise mode. This output is represented by respective pairs of electrical conductors 24 and 25 which are utilized to control an electric-to-hydraulic conversion device generally designated by the block 26 which controls the hydraulic pressure on opposite sides of the piston 27. Piston 27 strokes within a cylinder 28 and is directly connected to the slide valve element 11 to cause displacement thereof in accordance with the control afforded by the autopilot through the pilot valve assembly.

Boost valve position feedback is obtained by means of a potentiometer 31 having a tap 31a. As shown, the potentiometer is physically mounted on the boost cylinder housing and moves therewith. Tap 31a is actuated by the slide valve. The potentiometer 31 is energized by a suitable supply of electrical energy, in this case direct current, and tap 31a is electrically connected in a feedback loop with the autopilot. Thus, the position of the boost valve element functions to reduce autopilot output. As the aircraft's pitch attitude changes to correct the autopilot detected condition, the autopilot output diminishes and the system is returned to the condition illustrated with the boost valve and elevator neutralized.

Control surface position feedback is similarly obtained by means of a potentiometer 90 having a tap 85. The potentiometer 90 is physically mounted on the boost housing and moves therewith while tap 85 is affixed to the aircraft airframe. The potentiometer 90 is energized by a direct current source and the tap 85 is electrically connected in a feedback loop to the autopilot so that the position of the boost cylinder housing functions to reduce the autopilot output in a manner similar to that described for the boost valve position feedback arrangement particularized above.

The electric-to-hydraulic conversion device 26 may be of any type known to the art wherein the weak electric signals from a pair of output channels from the autopilot is converted to relatively strong hydraulic signals to actuate the slide valve in one direction or the other. Such a device is shown and described in the aforementioned application Serial No. 375,546. As described in the aforementioned application, a signal from autopilot output channels 24 and 25 will determine which of the ports 41 and 42 fluid entering chamber 28 will pass through in exhausting to a return line 21. When the aircraft is in the proper flight attitude, no fluid will pass through the device 26 to the exhaust line. Both exhaust ports 41 and 42 will be blocked and the pressure on opposite sides of the piston 27 will be equal; the piston 27 will occupy a neutral position by virtue of springs 29 in which the valves 12 and 13 seal their respective ports 14 and 15. On a departure from proper flight attitude, one or the other of the exhaust ports is blocked, and the hydraulic pressures on opposite sides of the piston 27 are unbalanced. Consequently, the actuator cylinder is displaced in one direction or the reverse, displacing the elevator to cause a pitch rate in such a sense as to restore the aircraft to the proper flight attitude or to a proper position in elevation depending on the nature of the autopilot control.

Manual control for the actuator cylinder is exercised from a control stick 63 through a mechanical linkage 69 connected to slide valve element 11. For the purpose of compensating for variations in the center of gravity of the aircraft due to firing of the armament thereof or to the diminishing fuel supply, a compensating arrangement utilizing a bungee spring 75 and a screw back comprising a direct current motor 70 mechanically coupled to worm gearing 70a is provided. The bungee spring comprises a housing 75a which is longitudinally positioned by the worm gearing 70a, and a coil spring 79 bearing against annular shoulders on axial rod 78 which axially positions control valve element 11 through a mechanical linkage 77. The worm gearing is driven by motor 70 through mechanical connection 74 in accordance with the energization of field windings 71 and 72 by single-pole double-throw switch 73. Switch 73 may conveniently be mounted on control stick 63 so as to be readily actuated by the pilot.

The bungee spring provides a force proportional to control stick displacement to enable the pilot to fly the aircraft by varying the force applied to the control system. When the pilot releases the control stick, the restoring force of the bungee spring comes into effect to centrally position the system.

To limit movement of the hydraulic actuator 3 when the centrifugal force on the aircraft approaches the value that would result in structural damage thereto when the craft is being pulled out of a dive, there is provided a protective mechanism including valve housing 47 having an axial well 44 which conveniently is cylindrical in form. An axial bore is drilled through the solid end of 47 of the housing 35 adapted to accommodate small conduit 34 in fluid-tight fit therewith. The other end of conduit 34 extends through a hole drilled through cylinder 28 into the right chamber formed by cylinder 28 and piston 27. A small sump 32 is formed in the end of housing 35 near the closed end of well 44. A small hole drilled through housing 35 opens into this sump, and a conduit 33 provides communication between sump 32 and the left chamber formed by cylinder 28 and piston 27. The housing is threaded at the open end of well 44 so as to accommodate a threaded plug 39; a coil spring 38 is fitted between a plug 39 and a cylindrical valve mmeber 37 which is in sliding fit with the cylindrical well 44 of cylinder 35. This valve member 37 prevents fluid flow from conduit 33 to conduit 34 when in abutting relationship with the closed end of well 44. A hole 36 is drilled through the cylindrical valve member 37 so as to permit free fluid flow from one end of the valve member to the other.

The plug 39 is adjusted so that spring 38 exerts sufficient force against cylindrical valve member 37 to keep the valve member in abutting relationship with the solid end 47 of the housing 35 until a predetermined centrifugal force is exerted on the cylindrical valve member due to the maneuvering of the aircraft. Under this circumstance, the valve member will move downward (as shown more perspicuously in Fig. 2), and free fluid communication is provided between conduits 33 and 34, and consequently between the right-hand chamber and the left-hand chamber formed by the piston 27 and cylinder 28. The pressure between opposite ends of the faces of piston 27 is thereupon relieved, and the slide valve element 11 and the hydraulic actuator are brought to their central positions. Upon reduction in the speed of the aircraft, the centrifugal force exerted upon piston 44 will be relieved and the piston will close, thereupon permitting control to be exerted again upon the aircraft elevator 1 until the predetermined centrifugal force that forces movement of valve member 37 is again attained.

In the embodiment shown, limitation of the centrifugal force on the aircraft is attained only when the aircraft is being pulled out of a dive or other downward movement. When it is desired to limit the centrifugal force of the aircraft when a climbing movement is being terminated, it is only necessary to provide an additional valve which is reversed in position to that shown in Figs. 1 and 2, so that valve member 37 moves upward rather than downward. Two such valves could be united in a single structure to limit centrifugal forces when the aircraft is being pulled either out of a climb or out of a dive.

Manifestly, this invention represents a unique solution to the problem of limiting the centrifugal forces exerted on an aircraft during flight maneuvers to the maximum centrifugal force permissible at any given speed of the aircraft without unduly hampering control exerted over the aircraft movements by a human pilot or by an autopilot. The specific components whereby this has been accomplished has been illustrated for the purpose of presenting on operable arrangement, and it is not to be construed that the system is limited in any way to the specific arrangement illustrated since the system may be modified both as to its details and as to its organization without departing from the spirit and scope thereof. Accordingly, it is intended that the foregoing disclosure and the showing made in the drawing shall be construed only as illustrative of the principles of this invention and are not to be interpreted in a limiting sense.

We claim as our invention:

1. A hydraulic control system for an aircraft comprising: a hydraulic actuator having a moving part including a chamber housing therein, a piston, and a piston rod affixed thereto, said hydraulic actuator being adapted for connection to a control surface of an aircraft; a boost valve mounted on said moving part of said actuator and having a moving valve element for controlling the flow of hydraulic fluid to said actuator; a second hydraulically actuated piston adapted to reciprocate within a second chamber and biased to a central position within said chamber whereat said moving valve element cuts off fluid flow to said actuator and connected to said moving valve element to actuate said boost valve; a spring loaded valve member; a valve housing for said spring loaded valve member having openings therein in fluid communication with said second chamber on both sides of said second piston; said spring loaded valve member normally preventing fluid communication between said openings until a predetermined centrifugal force is imposed thereon by a change in attitude of said aircarft.

2. A hydraulic control system for an aircraft comprising: a hydraulic actuator having a moving part including a chamber housing therein, a piston, and a piston rod affixed thereto, said hydraulic actuator being adapted for connection to a control surface of an aircraft; a boost valve mounted on said moving part of said actuator and having a moving valve element for controlling the flow of hydraulic fluid to said actuator; a second hydraulically actuated piston connected to said moving valve element, adapted to reciprocate within a second chamber and biased to a central position within said second chamber whereat said valve element cuts off fluid flow to said actuator; a valve housing having first and second openings therein respectively communicating with the interior on opposite sides of said second piston; a valve member in said housing normally blocking communication between said openings, and means in said housing adapted to permit said valve member to move a given distance under the influence of a predetermined centrifugal force to permit communication between said openings and to return said valve member to its initial position upon removal of said centrifugal force.

3. A hydraulic control system for an aircraft comprising: a hydraulic actuator having a moving part including a chamber housing therein, a piston, and a piston rod affixed thereto, said hydraulic actuator being adapted for connection to a control surface of an aircraft; a boost valve mounted on said moving part of said actuator and having a moving valve element for controlling the flow of hydraulic fluid to said actuator; a second hydraulically actuated piston connected to said moving valve element, adapted to reciprocate within a second chamber and biased to a central position within said second chamber whereat said valve element cuts off fluid flow to said actuator; a housing having a cylindrical well therein adapted to receive a cylindrical valve member in sliding fit therewith, said cylindrical well being screw threaded at the open end thereof to receive a screw threaded plug therein, first and second orifices in said housing respectively opening into said well at the bottom and side thereof, conduit means establishing fluid communication between said first and second orifices and the opposite sides of said second piston, spring means fitted between said valve member and said plug biasing said valve member so as to prevent fluid communication between said orifices, and an axial bore in said valve member permitting fluid flow between the ends of said valve member upon movement of said valve member, said valve member being adapted to move under the impetus of centrifugal force so as to permit fluid communication between said orifices.

4. A hydraulic control system for an aircraft comprising: a hydraulic actuator having a moving part including a chamber housing therein, a piston, and a piston rod affixed thereto, said hydraulic actuator being adapted for connection to a control surface of an aircraft; a boost valve mounted on said moving part of said actuator and having a moving valve element for controlling the flow of hydraulic fluid to said actuator; a second hydraulically actuated piston connected to said moving valve element, adapted to reciprocate within a second chamber and biased to a central position whereat said valve element cuts off fluid flow to said actuator; a housing having a well therein adapted to receive a valve member in sliding fit therewith, said well being screw threaded at the open end thereof to receive a screw threaded plug therein, first and second orifices in said housing respectively opening into said well at the bottom and side thereof, conduit means establishing fluid communication between said first and second orifices and the opposite sides of said second piston, spring means fitted between said valve member and said plug biasing said valve member so as to prevent fluid communication between said orifices, and an axial bore in said valve member permitting fluid flow between the ends of said valve member upon movement of said valve member, said valve member being adapted to move under the impetus of centrifugal force so as to permit fluid communication between said orifices.

5. A hydraulic control system for an aircraft comprising: a hydraulic actuator having a moving part including a chamber housing therein, a piston, and a piston rod affixed thereto, said hydraulic actuator being adapted for connection to a control surface of an aircraft; a boost valve mounted on said moving part of said actuator and having a moving valve element for controlling the flow of hydraulic fluid to said actuator; a second hydraulically actuated piston connected to said moving valve element, adapted to reciprocate within a second chamber and normally biased to a position whereat fluid pressure is cut off from said actuator; a housing having a well therein adapted to receive a valve member in sliding fit therewith; first and second orifices in said housing respectively opening into said well, conduit means establishing fluid communication between opposite ends of said second piston and said first and second orifices; first means biasing said valve member so as to prevent fluid communication between said orifices; said housing being positioned within said aircraft so that centrifugal force of a given sense will move said valve member against the inefluence of said first means to establish fluid communication between said orifices.

6. A hydraulic control system for an aircraft comprising: a hydraulic actuator including a chamber housing, a piston, and a piston rod affixed thereon, said hydraulic actuator being adapted to control the position of a control surface of an aircraft; valve means mounted on said moving part of said actuator and having a valve element for controlling the flow of hydraulic fluid to said actuator; means including a second piston connected to said valve means adapted to actuate said boost valve from a central position in accordance with the sense of externally produced differential pressure applied to said second piston; a housing having a cylindrical well therein adapted to receive a cylindrical valve member in sliding fit therewith, said cylindrical well being screw threaded at the open end thereof to receive a screw threaded plug therein, first and second orifices in said housing respectively opening into said well at the bottom and side thereof, conduit means establishing fluid communication between said first and second orifices and the opposite sides of said second piston, spring means fitted between said valve member and said plug biasing said valve member so as to prevent fluid communication between said orifices, and an axial bore in said valve member permitting fluid flow between the ends of said valve member upon movement of said valve member, said valve member being adapted to move under the impetus of centrifugal force so as to permit fluid communication between said orifices.

7. A hydraulic control system for an aircraft comprising: a hydraulic actuator having a moving part including a chamber housing therein, a piston, and a piston rod affixed thereon, said hydraulic actuator being adapted to control a control surface of an aircraft; a boost valve mounted on said moving part of said actuator and having a moving valve element for controlling the flow of hydraulic fluid to said actuator; means including a second piston connected to said boost valve adapted to actuate said boost valve from a central position to which said second piston is normally biased, in accordance with the sense of externally produced differential pressure applied to said second piston; a housing having a well therein adapted to receive a valve member in sliding fit therewith, said well being screw threaded at the open end thereof to receive a screw threaded plug therein, first and second orifices in said housing respectively opening into said well at the bottom and side thereof, conduit means establishing fluid communication between said first and second orifices and the opposite sides of said second piston, spring means fitted between said valve member and said plug biasing said valve member so as to prevent fluid communication between said orifices, and an axial bore in said valve member permitting fluid flow between the ends of said valve member upon movement of said valve member, said valve member being adapted to move under the impetus of centrifugal force so as to permit fluid communication between said orifices.

References Cited in the file of this patent

UNITED STATES PATENTS

| 2,222,886 | Voigt | Nov. 26, 1940 |
| 2,395,671 | Kleinhans et al. | Feb. 26, 1946 |